United States Patent
Hahn et al.

(10) Patent No.: US 7,117,221 B2
(45) Date of Patent: Oct. 3, 2006

(54) REPLICATION OF CHANGED INFORMATION IN A MULTI-MASTER ENVIRONMENT

(75) Inventors: Timothy J. Hahn, Cary, NC (US); John R. McGarvey, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 10/339,419

(22) Filed: Jan. 9, 2003

(65) Prior Publication Data

US 2004/0139083 A1    Jul. 15, 2004

(51) Int. Cl.
G06F 17/00 (2006.01)
G06F 17/30 (2006.01)

(52) U.S. Cl. .................. 707/101; 707/102; 707/202
(58) Field of Classification Search ........ 707/101–102, 707/202
See application file for complete search history.

(56) References Cited

U.S. PATENT DOCUMENTS

| | | | |
|---|---|---|---|
| 5,596,748 A | 1/1997 | Kleewein et al. ........... 395/610 |
| 5,832,517 A | 11/1998 | Knutsen, II ................. 707/202 |
| 5,838,923 A * | 11/1998 | Lee et al. .................... 709/236 |
| 5,999,935 A | 12/1999 | Clark et al. .................. 707/101 |
| 6,092,084 A | 7/2000 | Clark et al. .................. 707/202 |
| 6,122,640 A | 9/2000 | Pereira ........................ 707/103 |
| 6,615,223 B1 * | 9/2003 | Shih et al. ................... 707/201 |
| 2004/0068516 A1* | 4/2004 | Lee et al. ............... 707/103 Y |

FOREIGN PATENT DOCUMENTS

JP          2001084267          3/2001

OTHER PUBLICATIONS

"The LDUP Replication Update Protocol", E. Stokes, G. Good, R. Harrison, T. Hahn, Nov. 2001; http://www.ietf.org/internet-drafts/draft-ietf-ldup-protocol-03.txt; pp. 1-16.
"LDUP Update Reconciliation Procedures", S. Legg, A. Payne, Oct. 23, 2001; http://www.ietf.org/internet-drafts/draft-ietf-ldup-urp-05.txt; pp. 1-28.

* cited by examiner

*Primary Examiner*—Joon Hwan Hwang
(74) *Attorney, Agent, or Firm*—Arthur J. Samodovitz; Blanche E. Schiller

(57) ABSTRACT

Changed information is provided to multiple masters of a multi-master environment. In order to facilitate the providing of the changed information to the various masters, at least one replication data structure is used. This data structure is managed in such a way that conflicts are avoided in updating the data structure, and thus, in communicating the changed information to the masters.

18 Claims, 7 Drawing Sheets

STATUS TABLE

| ReplicaId | LastChangeVector |
|---|---|
| ⋮ | ⋮ |

*fig. 2A*

STATUS TABLE

| ReplicaId | LastChangeVector |
|---|---|
| 1 | 1,2; 2,1; 3,4; 4,3 |
| 2 | |
| 3 | |
| 4 | |

*fig. 2B*

CHANGE TABLE

| ChangeId | ReplicaId | EntryId | ChangeInformation |
|---|---|---|---|
| ⋮ | ⋮ | ⋮ | ⋮ |

*fig. 2C*

REPLICATION OF CHANGED INFORMATION IN A MULTI-MASTER ENVIRONMENT

TECHNICAL FIELD

This invention relates, in general, to replicating changed information between servers of a computing environment, and in particular, to replicating changed information between multiple master servers of a multi-master server environment.

BACKGROUND OF THE INVENTION

Replication is a mechanism in which information held on one server, e.g., a directory server, is copied or replicated to one or more other servers, all of which provide access to the same set of information. Replication can be performed in various ways and based on different replication models. As examples, one replication model includes a master/slave model, while another model includes a multi-master model, each of which is described below.

In the master/slave replication model, a single server is the updateable master server, while the other servers are read-only slave servers. Although this model can assist in load-balancing heavily read-biased workloads, it is deficient in those environments that require highly available, work-load-balanced read/write access to information in a directory. To address these needs, multi-master replication is employed.

With multi-master replication, multiple servers allow simultaneous write access to the same set of information by allowing each server to update its own copy of the set of information. Protocols are then used to transmit changes made at the different master servers to other master servers so that each server can update its copy of the information. Conflict resolution techniques are also used to workout differences resulting from simultaneous and/or conflicting updates made at multiple different master servers in the multi-master environment.

Although replication protocols have been established to manage the provision of changes made at multiple servers, enhancements are still needed. For example, a need still exists for a replication capability that provides the information in a simpler and more timely manner. As another example, a need still exists for a replication capability that avoids the need for conflict resolution at the time of providing the changed information.

SUMMARY OF THE INVENTION

The shortcomings of the prior art are overcome and additional advantages are provided through the provision of a method of facilitating the providing of change information to masters of a multi-master environment, wherein at least two masters of the multi-master environment have a copy of the replicated set of information. The method includes, for instance, writing by a master of the multi-master environment a change information entry to a data structure modifiable by a plurality of masters of the multi-master environment, wherein the change information entry corresponds to one or more changes of the master's copy of the replicated set of information; and providing the data structure to another master of the multi-master environment to enable the another master to update its copy of the replicated set of information.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2a and 2c depict an embodiment of replication data structures, including a status data structure and a change data structure, used in accordance with an aspect of the present invention;

FIG. 2b depicts further details of the status data structure of FIG. 2a, in accordance with an aspect of the present invention;

BEST MODE FOR CARRYING OUT THE INVENTION

Figure 1A:
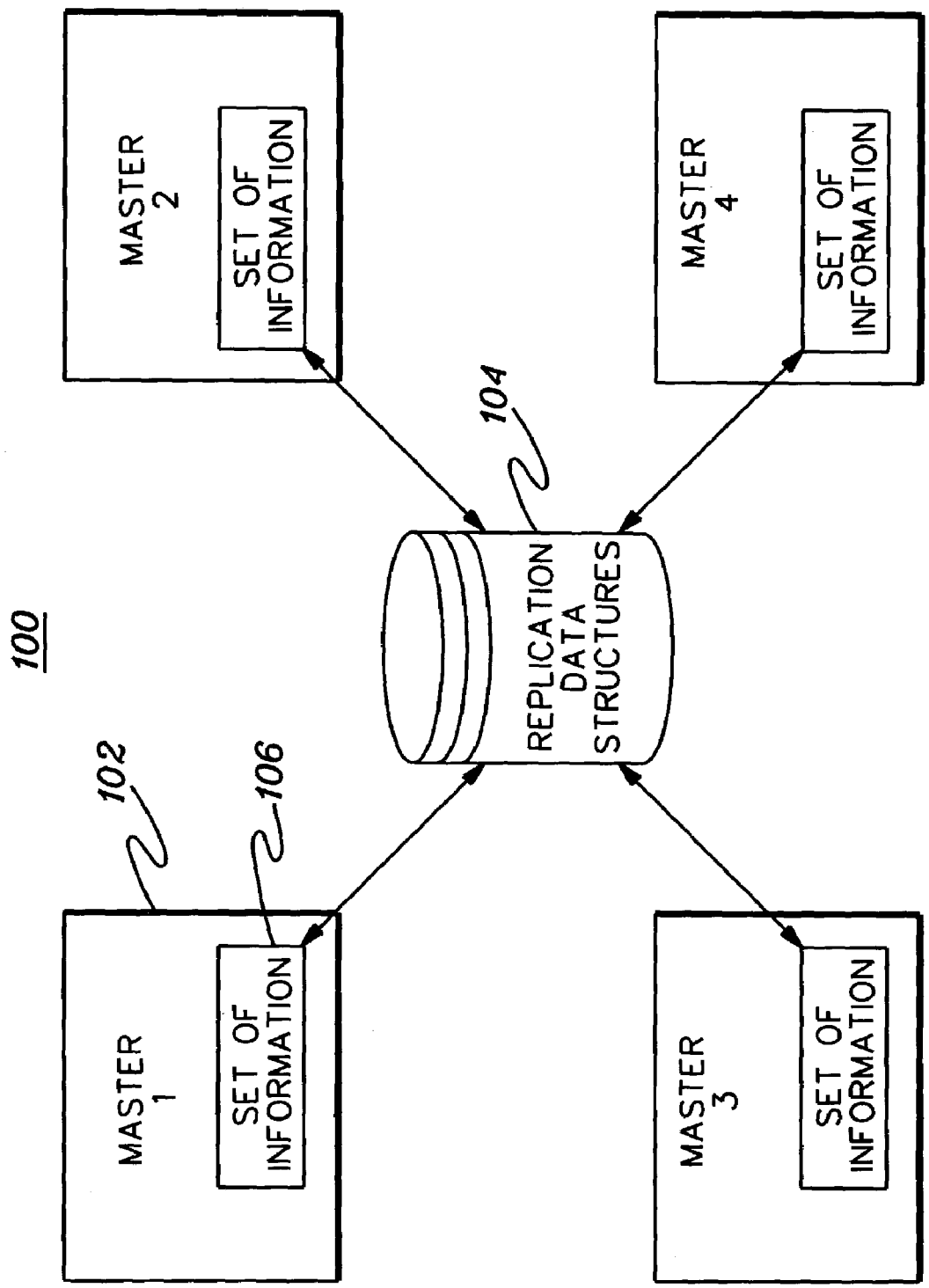
FIG. 1a depicts one embodiment of a computing environment incorporating and using one or more aspects of the present invention.

In accordance with an aspect of the present invention, a replication capability is provided for a multi-master environment in which changed information is replicated among multiple masters of the environment, in such a manner that conflict resolution is substantially avoided in communicating the changes. In a further aspect, change information is communicated, even if a particular server is not available at the time the change is made. This is accomplished by, for example, using one or more data structures to provide the changed information to the various masters.

One embodiment of a computing environment incorporating and using one or more aspects of the present invention is described with reference to FIG. 1a. In one example, a multi-master environment 100 includes a plurality (e.g., four) of masters 102 coupled to one another via one or more replication data structures 104. In one example, each master is a server, such as an LDAP directory server, residing on at least one of various computing units, including, for instance, RS/6000s, pSeries or zSeries main frames, offered by International Business Machines Corporation, Armonk, N.Y. Each master, also referred to as a replica, includes one or more sets of information 106, including, for instance, one or more directories.

A directory is a database, which is structured as a hierarchical tree of entries. An entry includes information in the form of attribute/value combinations. An attribute has a name, referred to as the attribute type, and one or more values. An attribute containing more than one value is referred to as multi-valued. Operations can be performed against the directory tree. These include adding an entry to the tree; modifying an entry; deleting an entry; searching for entries matching a filter, starting at some root entry; reading an entry; and comparing an attribute value to a test/assertion value. In one example, the directories are managed by one or more masters, which are also known as directory servers or replicas. A master provides access to one or more trees of entries, as well as some form of replication with other directory servers.

In one example, replication includes transmitting changes made to a directory between multiple masters holding copies of the directory. In accordance with an aspect of the present invention, the transmission includes employing at least one replication data structure 104. As one example, there is a set of replication data structures (e.g., a change table and a status table) for each replicated set of information (e.g., each replicated directory). That is, if there are two directories replicated on four masters, then there is a change table and a status table for each of the two directories. The tables (e.g., the change tables) serve as the communications medium by which the masters or replicas are informed of changes made to the directory entries. Further details regarding the replication data structures are described below.

One embodiment of a status data structure is described with reference to FIG. 2a. As one example, the status data structure includes a status table 200 having one or more rows 202. A row is allocated for each server that is participating in the replication environment. Thus, for the particular example of FIG. 1a, status table 200 includes four rows, one for each of Masters 1–4. Each row includes, for example, a ReplicaId 204, which is a primary key for the table and uniquely identifies the master that owns that row; and a LastChangeVector 206, which represents the last changes processed by this replica for changes that originated from the replicas participating in the replication.

In one example, the vector includes one or more pairs of values 210 (FIG. 2b), each pair identifying the replica 212 that originated the change on that replica's copy of the directory; and the last change processed 214 for the change originating replica by the replica 216 owning the row. For instance, for Replica 1, the last change it processed for changes originated by itself is change 2; the last change it processed for changes originated by Replica 2 is change 1; the last change it processed for changes originated by Replica 3 is change 4; etc. The LastChangeVector is used, for example, by a replica to determine the next set of changes to be processed; and as a further example, by the replicas to determine what set of changes have been processed by all the participating replicas so that clean-up of those changes can take place.

One embodiment of a change data structure is described with reference to FIG. 2c. In one example, the change data structure includes a change table 220 having one or more rows 222. There is a change table for each replicated set of information (e.g., each directory), and a row is created in the change table for each change that is made to the set of information corresponding to the change table, regardless of the master making the change. Thus, rows are added to the change table, in response to changes made to the directory by any master.

Rows are deleted from the change table, in response to any master noticing that the changes of the rows have been seen by all the masters participating in the replication environment. Rows in the change table are not updated. This enables multiple masters to simultaneously write to the change table without conflicts.

In one example, row 222 of the change table includes, for instance, a ChangeId 224, which is a primary key for the table, and is a value that uniquely identifies the change; a ReplicaId 226 that indicates the master or replica that performed the change; an EntryId 228 that indicates the entry in the directory upon which the change was made; and ChangeInformation 230 that includes the detailed set of changes that were applied to the entry by the replica that made the change. The ReplicaId aids in processing/searching the change table as changes sometimes are searched by the replica in which the change was made. The changes in the change table are provided to the various replicas of the environment, so that the replicas can apply the changes to their copies of the directory.

Figure 1B:
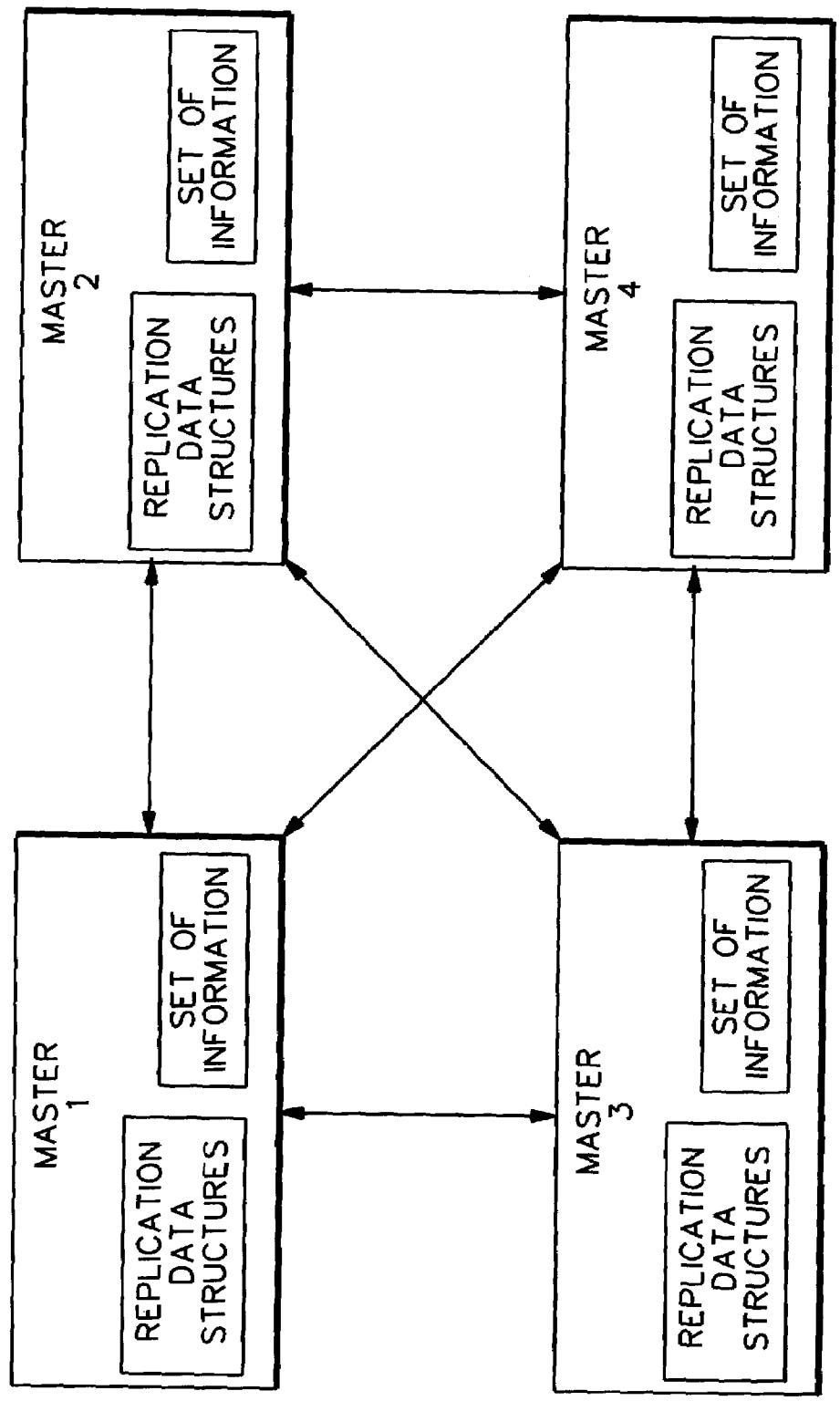
FIG. 1b depicts another embodiment of a computing environment incorporating and using one or more aspects of the present invention.

The replication data structures may be centrally located and remotely accessible to the masters, as depicted in FIG. 1a, or they, themselves, may be replicated and located at each master, as depicted in FIG. 1b. A combination of the above or other variations may also exist. In one embodiment, when the data structures are remotely located, a distributed two-phase commit is used to enable the data structure updates to be performed within the same transactional scope as the updates made to the directory server on which the change originated.

To manage the replication data structures, operations are applied thereto. As an example, the status table is modified (i.e., rows are added or deleted), in response to replicas being added or deleted from the environment. Further details regarding these operations are described below.

Figure 3:
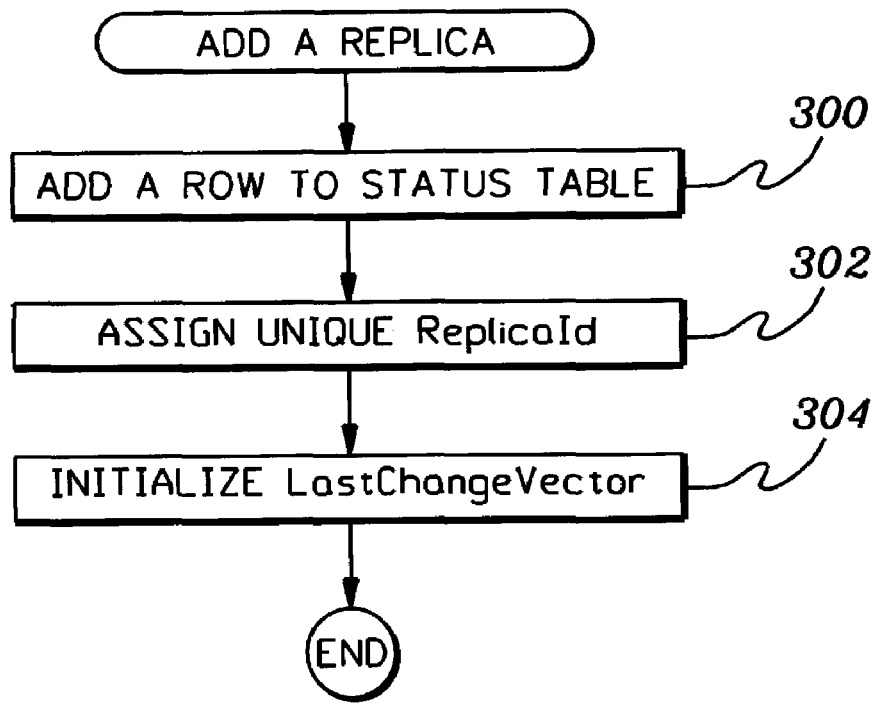
FIG. 3 depicts one embodiment of the logic associated with updating the status data structure, in response to a replica being added to the environment, in accordance with an aspect of the present invention.

For example, one embodiment of the logic associated with modifying the status table to reflect an add of a replica to the environment is described with reference to FIG. 3. In response to being added to the environment, the replica adds a row to the status table, STEP 300. Thereafter, a unique ReplicaId is assigned to the row identifying the added replica, STEP 302. Further, LastChangeVector is initialized to values indicating the oldest possible change id (e.g., 0) for each replica participating in replication, STEP 304.

Figure 4:
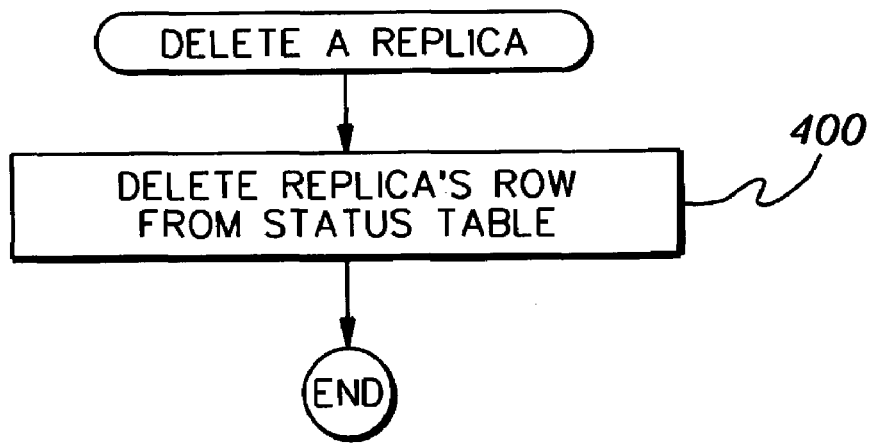
FIG. 4 depicts one embodiment of the logic associated with updating the status data structure, in response to a replica being deleted from the environment, in accordance with an aspect of the present invention.

As a further example, the status table is updated when a replica is deleted from the computing environment. One embodiment of the logic associated with modifying the status table to reflect the deletion is described with reference to FIG. 4. In response to being deleted, the replica deletes its row from the status table, STEP 400. However, the LastChangeVector of the remaining replicas is not reduced in size at this time. This is to ensure that the remaining replicas can still process updates that are found in the change table which originated from the removed replica.

In addition to performing operations on the status table, operations are also performed on the change table. In one example, the change table is modified (i.e., a row is added), in response to adding an entry to the directory, modifying an existing directory entry or directory entry's name, or deleting a directory entry.

Figure 5:
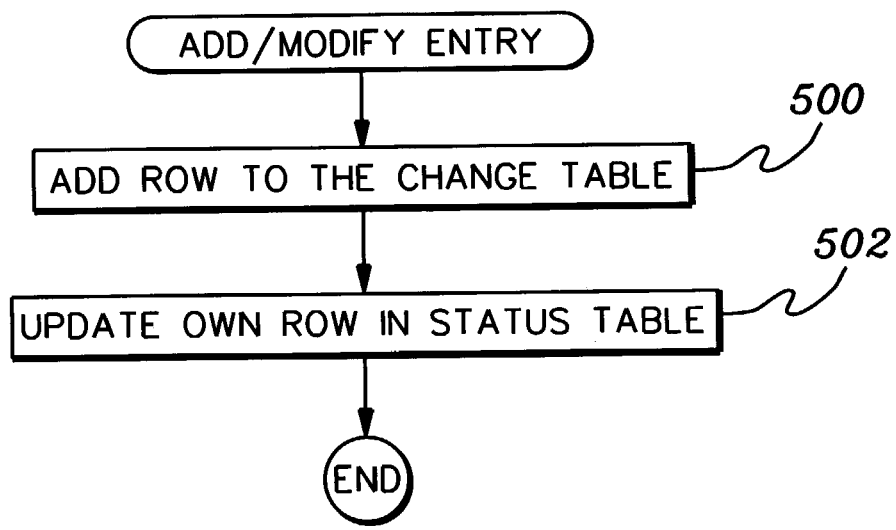
FIG. 5 depicts one embodiment of the logic associated with updating the replication data structures to reflect the adding or modifying of information in a set of information, in accordance with an aspect of the present invention.

One embodiment of the logic associated with modifying the change table, as well as the status table, based on an add/modification to a directory entry is described with reference to FIG. 5. In response to adding a directory entry, the replica in which the add was performed adds a row to the change table in order to keep track of the entry being added, STEP 500. For example, a unique ChangeId and a ReplicaId of the replica adding the directory entry are specified. Additionally, an EntryId is provided, as well as ChangeInformation describing the addition.

Moreover, in one embodiment, the status table is updated to reflect the addition, STEP 502. For example, the replica's LastChangeVector value corresponding to itself is updated with the ChangeId of the row added to the change table. As an example, assume Replica 1 added a change identified as ChangeId 7, then the LastChangeVector in the row owned by Replica 1 is updated by changing the ChangeId corresponding to Replica 1 to 7 (e.g., 1,7).

Similar logic is performed when a directory entry is modified. For example, with reference to FIG. 5, to keep track of a directory entry being modified, the replica in which the modification was performed adds a row to the change table, which indicates the entry that was modified, STEP 500. Additionally, the status table is updated by changing the replica's LastChangeVector value corresponding to itself to the ChangeId of the row added to change table, STEP 502.

In addition to adding or modifying an entry, an existing entry's name may also be modified. Again, one embodiment of the logic associated with modifying the replication data structures to reflect a modification to an entry's name is described with reference to FIG. 5. To keep track of an entry's name being modified, the replica in which the name modification was performed adds a row to the change table indicating the entry's name that was modified, STEP 500. The status table is updated, as described previously, STEP 502. For instance, the replica's LastChangeVector value corresponding to itself is updated with the ChangeId of the row added to the change table.

Figure 6:
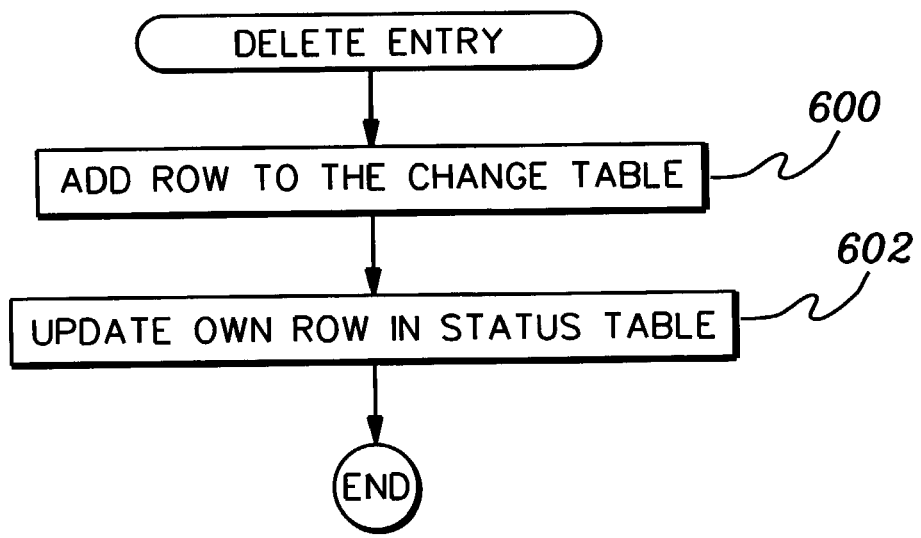
FIG. 6 depicts one embodiment of the logic associated with updating the replication data structures to reflect the deleting of information from the set of information, in accordance with an aspect of the present invention.

A further operation that can be performed on a directory is deleting an entry from a directory. Thus, one embodiment of the logic associated with updating the replication data structures in view of a delete is described with reference to FIG. 6. To keep track of an entry being deleted, the replica in which the delete was performed adds a row to the change table which indicates that the entry was deleted, STEP 600. Additionally, the status table is updated, STEP 602. For example, the replica's LastChangeVector value corresponding to itself is updated with the ChangeId of the row added to the change table.

In the above processing, it is shown that in order to reflect a change made to the directory, a unique row is added to the change table. No row in the change table is updated, rather a new row is added. This enables conflict resolution to be avoided when updating the replication data structures to reflect the adding, modifying or deleting of entries in the directory.

After each replica participating in replication has processed a change, that row can be removed from the change table. There is no requirement that the rows be removed immediately after the replicas have processed them. However, it is desirous that they be removed at some point after all the replicas have processed the change.

There are various strategies for removing the old changes from the change table. The process of removing this information is called purge processing. Regardless of the strategy used (e.g., check on every update, check only after every n updates, separate background task), the tables are constructed such that any replica can perform purge processing, even multiple replicas simultaneously. The worst case scenario is that multiple replicas try to delete the same row from the status table. Duplicate deletion is an easy conflict to resolve, however. The additional deletion is simply ignored or from the replica's point of view, if the deletion fails because the row does not exist, it is considered normal processing and no error is provided.

Figure 7:
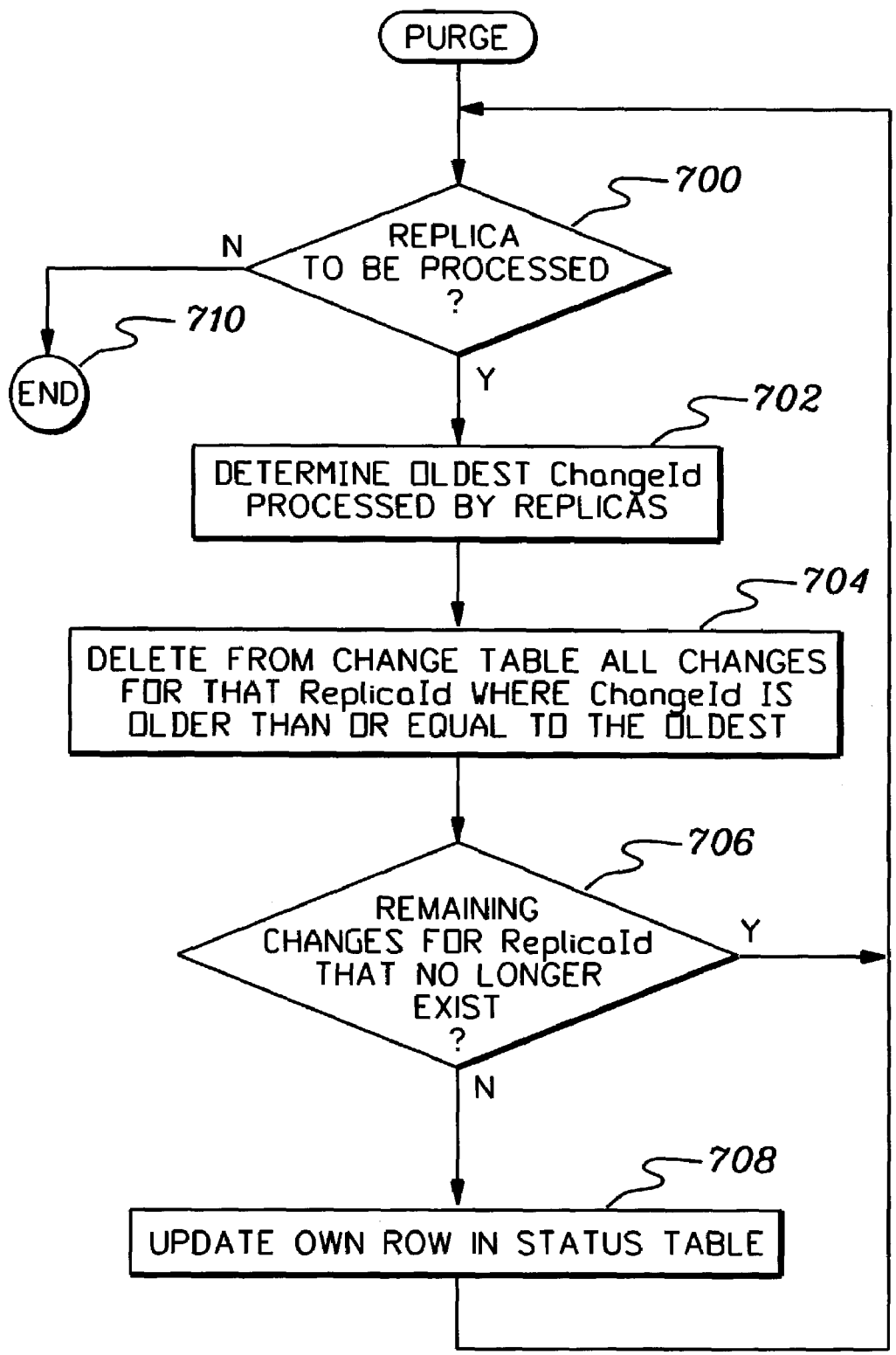
FIG. 7 depicts one embodiment of the logic associated with purging entries from the change data structure, in accordance with an aspect of the present invention.

One embodiment of the logic associated with purge processing is described with reference to FIG. 7. This processing is performed by any one of the replicas. Initially, a determination is made as to whether there is a replica to be processed, INQUIRY 700. That is, is there a remaining ReplicaId that has not been considered during the purge processing.

If there is a replica to participate in the processing, then for the selected replica, a determination is made as to the oldest ChangeId of the selected replica that has been processed by all the replicas, STEP 702. This is accomplished by examining the LastChangeVector for the replicas and determining the oldest ChangeId for the ReplicaId. Thereafter, all changes for that ReplicaId, where the ChangeId is older than or equal to the oldest ChangeId determined in STEP 702 is deleted from the change table, STEP 704.

Subsequently, a determination is made as to whether there are remaining changes for a ReplicaId that no longer exists, INQUIRY 706. In one example, this determination is made by searching the change table by ReplicaId. If there are no remaining changes for a ReplicaId which no longer exists in the set of replicas, then the status table may be updated, STEP 708. For example, a replica can remove the ChangeId value for that replica from its own LastChangeVector. In this example, replicas only update their own status table row, so a replica during purge processing can only update its own status table row. (In other embodiments, a replica can remove a replica from its own LastChangeVector during add, modify and/or delete processing.)

If, on the other hand, there are remaining changes for the ReplicaId, then processing continues with INQUIRY 700. When all of the participating replicas have been processed, the purge processing is complete, STEP 710.

Figure 8:
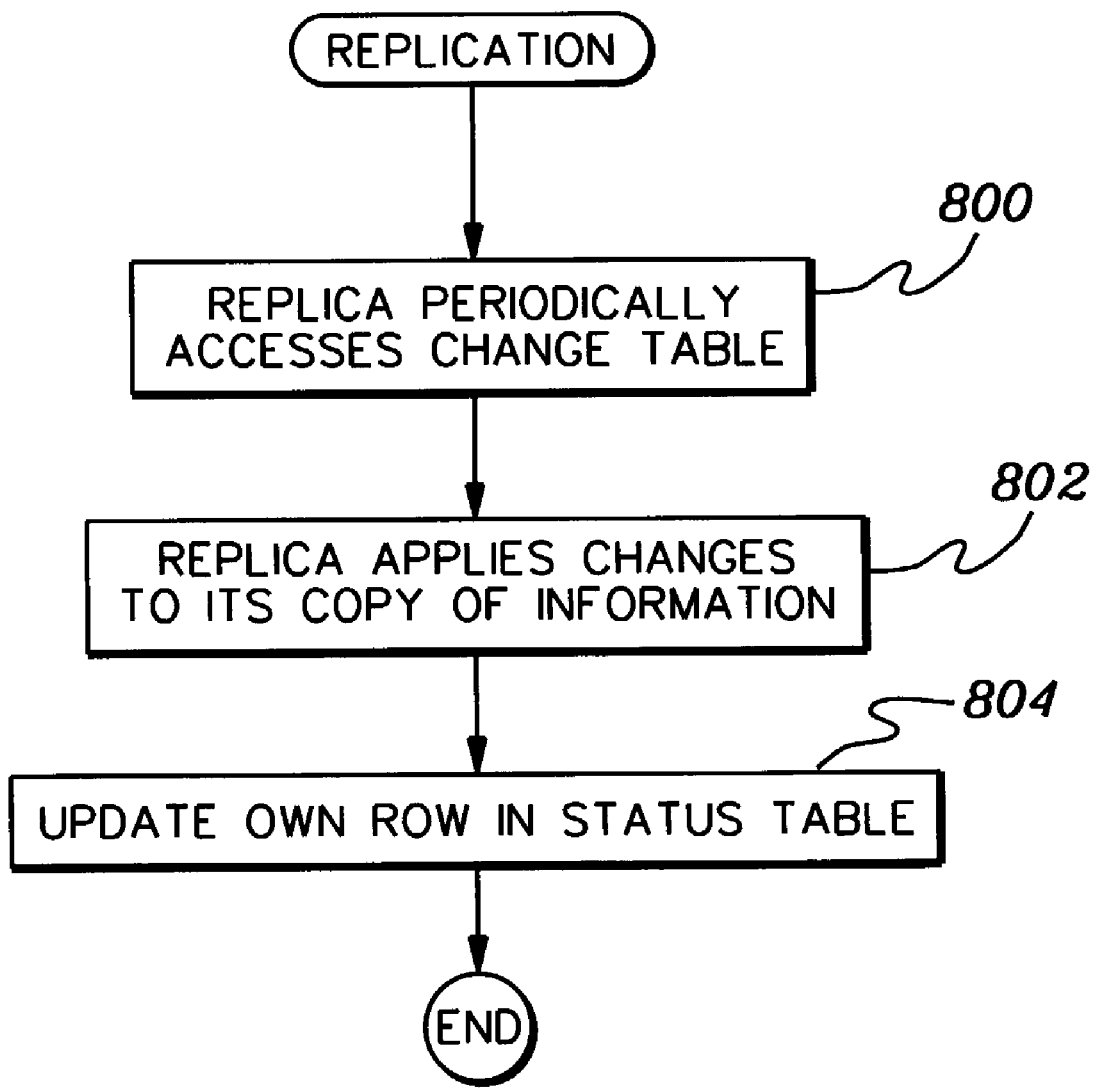
FIG. 8 depicts one embodiment of the logic associated with replication processing, in accordance with an aspect of the present invention.

The information held in the change table is used to inform masters participating in the replication environment of changes made to the directory by other masters. One embodiment of the logic associated with providing this changed information to one or more masters is described with reference to FIG. 8. As one example, each replica participating in replication periodically accesses the change table to learn of any changes, STEP 800. There are a number of different ways to process the change table, but in one example, it includes searching the change table based on ChangeId and ReplicaId to process, in ChangeId order, the updates that are newer than the ChangeId values held in the LastChangeVector for the replica. Since there is a ChangeId in the LastChangeVector for each ReplicaId, the processing may start at different points in the change table based on the ReplicaId in which the change was made.

In response to learning of changes, the replica applies the changes logged in the change table to its own copy of the directory, STEP 802. The manner in which these changes are applied are database dependent. Each database may be of its own type, have its own structure and/or format, and the master is able to understand the nature of the proposed updates, even though they originated from another server. Known techniques are used to reconcile any changes to be applied, if there are conflicts at the application time. Each master updates its own database in the structure and format of its database.

Thereafter, the replica updates its own row in the status table, STEP 804. In one example, this is accomplished by changing the LastChangeVector of the replica's row based on the changes it processed from the change table. For example, if ReplicaId 1 just applied change 7 of changes originating from ReplicaId 2, then the ChangeId in the LastChangeVector corresponding to ReplicaId 2 in the row owned by ReplicaId 1 is updated to 7, etc. This completes replication processing.

Described in detail above is a capability for facilitating the providing of changed information to multiple masters of a multi-master environment, while substantially avoiding conflict resolution during the providing of the changed information. The capability is relatively simple to use and provides the information in a timely manner. In one example, the capability employs one or more data structures to communicate the changed information.

In accordance with an aspect of the present invention, non-conflicting updates are made to the data structures for various operations applied thereto. Row additions are uniquely made, either by ReplicaId or ChangeId. Further, row updates of the status table are isolated to a single updater, since each status table row is owned by a particular replica.

Although in the above embodiments, the replication data structures are tables, this is only one example. Other types of data structures may also be used. Further, in another embodiment, techniques other than employing status data structures may be used in cleaning up the change data structures. The use of status data structures is only one example.

Additionally, in other embodiments, the LastChangeVector does not include values for the replica owning that row. Thus, the status table is not updated in those situations in which the owning replica is adding a row to the change table, as an example.

Moreover, although in the above embodiments, there is a change table for each replicated set of information, in other embodiments the change table may accommodate multiple replicated sets of information.

Further, even though the masters are servers in the examples above, other types of masters can participate in one or more aspects of the present invention.

In another aspect of the present invention, information in the change table is protected from viewing except from other masters, while the information is in the table and in transit between the masters. This is facilitated by using, for instance, a digital envelope technique. The digital envelope includes, for instance, encrypted bulk-encryption keys for each recipient server, which are encrypted using the public key of each recipient server. The bulk-encryption keys can be decrypted by each recipient using its private key. This is a form of multi-cast of enveloped information.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of managing replication information, said method comprising the steps of:
   generating a first table having rows, each of said rows identifying a respective change replicated by a respective server, describing said respective change replicated by said respective server, and identifying said respective server which replicated said respective change;
   generating a second table,
      said second table having a first row for a first one of a plurality of servers, wherein said first row comprising an identity of a last change which has been replicated by said first server and originated from said first server and an identity of a last change which has been replicated by said first server and originated from a second server of said plurality of servers, and
      said second table having a second row for said second server of said plurality of servers, wherein said second row comprising an identity of a last change which has been replicated by said second server and originated from said second server and an identity of a last change which has been replicated by said second server and originated from said first server; and
   identifying from said second table an identification of a change which has been replicated by both said first and second servers, and in response, deleting a row in said first table for said change which has been replicated by both said first and second servers, wherein said identifying and said deleting are performed by one of said first or second server.

2. A computer-implemented method as set forth in claim 1, wherein the step of identifying from said second table an identification of a change which has been replicated by both said first and second servers, comprises the step of identifying an oldest change which has been replicated by both said first and second servers.

3. A computer-implemented method as set forth in claim 2, wherein identification for each change indicates a relative age of said each change.

4. A computer-implemented method as set forth in claim 1, wherein said change which has been replicated by both said first and second servers originated from said first server; and further comprising the subsequent steps of:
   identifying from said first table at least one other change originating from said first server, wherein said at least one other change is still listed in said first table and is older than said change which has been replicated by both said first and second servers; and deleting from said first table said at least one other change originating from said first server, wherein said at least one other change is still listed in said first table and is older than said change which has been replicated by both said first and second servers.

5. A computer-implemented method as set forth in claim 4, wherein said at least one other change originating from said first server is identified in part based on a comparison of an identifier of said at least one other change to an identifier for said change which has been replicated by both said first and second servers.

6. A computer-implemented method as set forth in claim 1, further comprising the steps of:
said first server replicating a latest change in said first server, and in response, said first server updating said first row of said second table to indicate said first server replicated said latest change in said first server; and
said second server replicating a latest change in said second server, and in response, said second server updating said second row of said second table to indicate said second server replicated said latest change in said second server.

7. A system for managing replication information, said system comprising:
a processor;
means for generating a first table having rows, each of said rows identifying a respective change replicated by a respective server, describing said respective change replicated by said respective server, and identifying said respective server which replicated said respective change;
means for generating a second table,
said second table having a first row for a first one of a plurality of servers, wherein said first row comprising an identity of a last change which has been replicated by said first server and originated from said first server and an identity of a last change which has been replicated by said first server and originated from a second server of said plurality of servers, and
said second table having a second row for said second server of said plurality of servers, wherein said second row comprising an identity of a last change which has been replicated by said second server and originated from said second server and an identity of a last change which has been replicated by said second server and originated from said first server; and
means for identifying from said second table an identification of a change which has been replicated by both said first and second servers, and in response, deleting a row in said first table for said change which has been replicated by both said first and second servers, wherein said identifying and said deleting are performed by one of said first or second server.

8. A system as set forth in claim 7, wherein said means for identifying from said second table an identification of a change which has been replicated by both said first and second servers, comprises means for identifying an oldest change which has been replicated by both said first and second servers.

9. A system as set forth in claim 8, wherein identification for each change indicates a relative age of said each change.

10. A system as set forth in claim 7, wherein said change which has been replicated by both said first and second servers originated from said first server; and further comprising:

means for identifying from said first table at least one other change originating from said first server, wherein said at least one other change is still listed in said first table and is older than said change which has been replicated by both said first and second servers; and
means for deleting from said first table said at least one other change originating from said first server, wherein said at least one other change is still listed in said first table and is older than said change which has been replicated by both said first and second servers.

11. A system as set forth in claim 10, wherein said at least one other change originating from said first server is identified in part based on a comparison of an identifier of said at least one other change to an identifier for said change which has been replicated by both said first and second servers.

12. A system as set forth in claim 7, further comprising:
said first server including means for replicating a latest change in said first server and updating said first row of said second table to indicate said first server replicated said latest change in said first server; and
said second server including means for replicating a latest change in said second server and updating said second row of said second table to indicate said second server replicated said latest change in said second server.

13. A computer program product for managing replication information, said computer program product comprising:
a computer-readable storage media;
first program instructions to generate a first table having rows, each of said rows identifying a respective change replicated by a respective server, describing said respective change replicated by said respective server, and identifying said respective server which replicated said respective change;
second program instructions to generate a second table,
said second table having a first row for a first one of a plurality of servers, wherein said first row comprising an identity of a last change which has been replicated by said first server and originated from said first server and an identity of a last change which has been replicated by said first server and originated from a second server of said plurality of servers, and
said second table having a second row for said second server of said plurality of servers, wherein said second row comprising an identity of a last change which has been replicated by said second server and originated from said second server and an identity of a last change which has been replicated by said second server and originated from said first server; and
third program instructions to identify from said second table an identification of a change which has been replicated by both said first and second servers, and in response, delete a row in said first table for said change which has been replicated by both said first and second servers, wherein said third program instructions to identify and delete are performed by one of said first or second server; and,
wherein said first, second, and third program instructions are stored on said computer-readable storage media in functional form.

14. A computer program product as set forth in claim 13, wherein said third program instructions identify from said second table an identification of a change which has been replicated by both said first and second servers, by identifying an oldest change which has been replicated by both said first and second servers.

15. A computer program product as set forth in claim 14, wherein identification for each change indicates a relative age of said each change.

16. A computer program product as set forth in claim 13, wherein said change which has been replicated by both said first and second servers originated from said first server; and further comprising:
- fourth-program instructions to identify from said first table at least one other change originating from said first server, wherein said at least one other change is still listed in said first table and is older than said change which has been replicated by both said first and second servers; and
- fifth program instructions to delete from said first table said at least one other change originating from said first server, wherein said at least one other change is still listed in said first table and is older than said change which has been replicated by both said first and second servers; and,
- wherein said fourth and fifth program instructions are stored on said computer-readable storage media in functional form.

17. A computer program product as set forth in claim 16, wherein said at least one other change originating from said first server is identified in part based on a comparison of an identifier of said at least one other change to an identifier for said change which has been replicated by both said first and second servers.

18. A computer program product as set forth in claim 13, further comprising:
- fourth program instructions for execution in said first server to replicate a latest change in said first server and update said first row of said second table to indicate said first server replicated said latest change in said first server; and
- fifth program instructions for execution in said second server to replicate a latest change in said second server and update said second row of said second table to indicate said second server replicated said latest change in said second server; and,
- wherein said fourth and fifth program instructions are stored on said computer-readable storage media in functional form.

* * * * *